US012017097B2

(12) United States Patent
Heusser et al.

(10) Patent No.: US 12,017,097 B2
(45) Date of Patent: Jun. 25, 2024

(54) BLOWER DEVICE FOR A RESPIRATORY PROTECTION SYSTEM

(71) Applicant: Optrel Holding AG, Wattwil (CH)

(72) Inventors: Jonathan Heusser, Uerikon (CH); Robert Buechel, Wattwil (CH); Daniel Bloechlinger, St. Gallenkappel (CH); Jasper Brouwer, Staefa (CH)

(73) Assignee: Optrel Holding AG, Wattwil (CH)

(*) Notice: Subject to any disclaimer, the term of this patent is extended or adjusted under 35 U.S.C. 154(b) by 630 days.

(21) Appl. No.: 17/126,648

(22) Filed: Dec. 18, 2020

(65) Prior Publication Data

US 2021/0187333 A1 Jun. 24, 2021

(30) Foreign Application Priority Data

Dec. 20, 2019 (EP) .................................... 19218887

(51) Int. Cl.

| | |
|---|---|
| ***A62B 7/10*** | (2006.01) |
| ***A62B 9/04*** | (2006.01) |
| ***A62B 18/00*** | (2006.01) |
| ***A62B 18/02*** | (2006.01) |
| ***A62B 23/02*** | (2006.01) |
| ***F04D 29/70*** | (2006.01) |

(52) U.S. Cl.

CPC ................. *A62B 7/10* (2013.01); *A62B 9/04* (2013.01); *A62B 18/006* (2013.01); *A62B 18/025* (2013.01); *A62B 23/02* (2013.01); *F04D 29/701* (2013.01); *F04D 29/703* (2013.01)

(58) Field of Classification Search

CPC .... A62B 7/10; A62B 7/12; A62B 9/04; A62B 9/06; A62B 18/006; A62B 18/02; A62B 18/025; A62B 18/04; A62B 18/045; A62B 18/08; A62B 18/084; A62B 23/02; F04D 29/701; F04D 29/703; A61M 16/0066

See application file for complete search history.

(56) References Cited

U.S. PATENT DOCUMENTS

2009/0266361 A1* 10/2009 Bilger .................. A62B 18/006 128/204.21

2009/0314295 A1* 12/2009 Hatmaker ............ A62B 18/006 128/205.12

(Continued)

FOREIGN PATENT DOCUMENTS

CN 105816972 A * 8/2016

JP 2011064117 A * 3/2011

(Continued)

OTHER PUBLICATIONS

English Machine Translation of KR-101772363-B1 provided by PE2E (Year: 2017).*

(Continued)

*Primary Examiner* — Joseph D. Boecker
*Assistant Examiner* — Brian T Khong
(74) *Attorney, Agent, or Firm* — Posz Law Group, PLC

(57) ABSTRACT

A blower device for a respiratory protection system comprises a fan for a generation of an airflow and comprises one or more filter element that is flowed through by the airflow. The fan is arranged at least partly beside the one or more filter element. The airflow is deflected between the fan and the filter element.

13 Claims, 9 Drawing Sheets

(56) References Cited

U.S. PATENT DOCUMENTS

Figure 1:
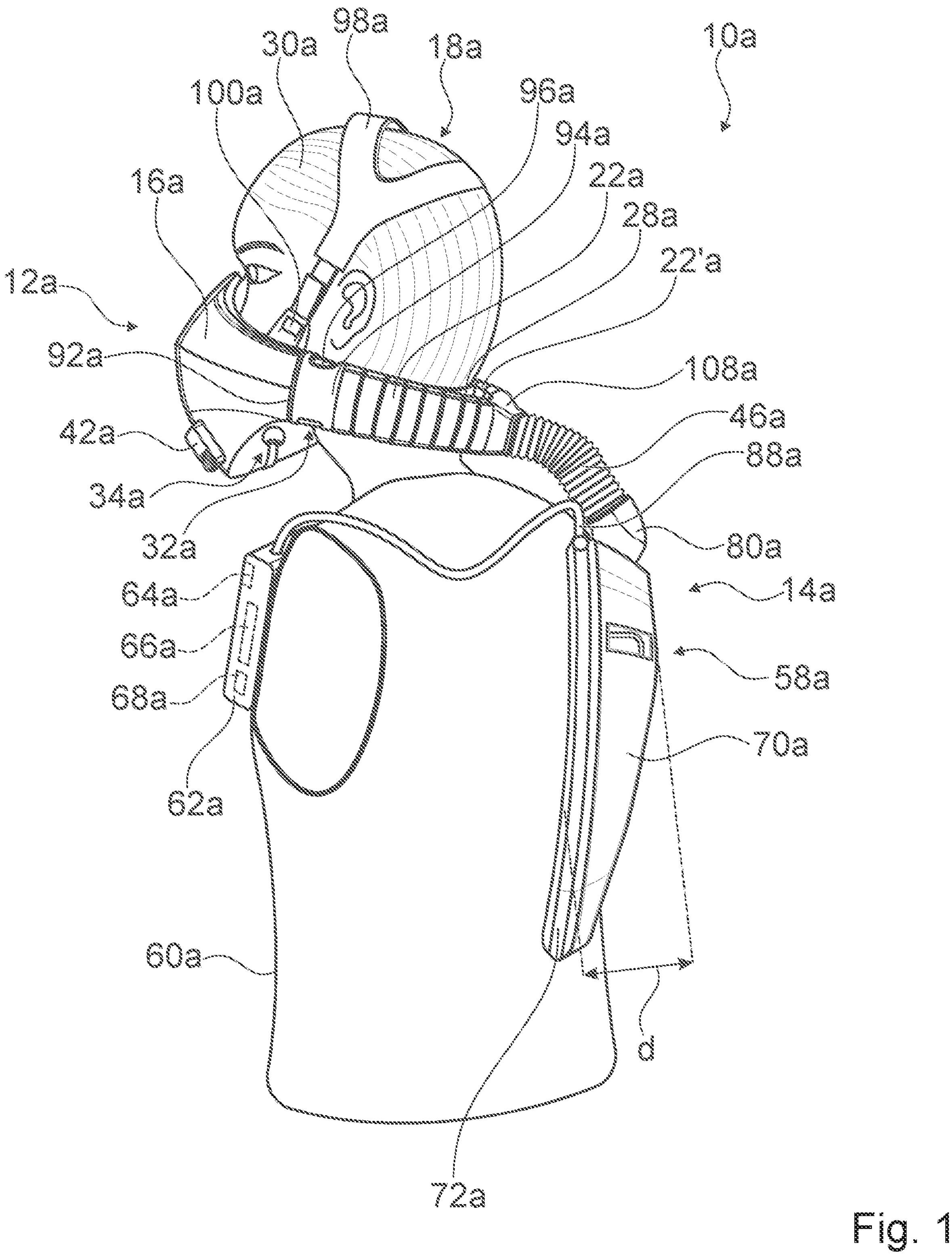

| | | | | |
|---|---|---|---|---|
| 2012/0051904 | A1* | 3/2012 | Hagen | B62K 11/02 415/224 |
| 2013/0014752 | A1* | 1/2013 | Ausen | A62B 18/04 128/205.12 |
| 2015/0023782 | A1* | 1/2015 | Velzy | F04D 29/701 415/119 |
| 2017/0028157 | A1* | 2/2017 | Nitta | A61M 16/0066 |
| 2017/0189727 | A1* | 7/2017 | Hunter | A62B 18/006 |
| 2018/0021605 | A1 | 1/2018 | Bartkoski | |

FOREIGN PATENT DOCUMENTS

| | | | |
|---|---|---|---|
| KR | 101772363 | B1 * | 8/2017 |
| WO | 2011/006206 | A1 | 1/2011 |

OTHER PUBLICATIONS

English Machine Translation of CN-105816972-A provided by PE2E (Year: 2016).*
English Machine Translation of JP-2011064117-A provided by PE2E (Year: 2011).*
Extended European Search Report dated Jun. 16, 2020 issued in corresponding EP application No. 19218887.8 (and English translation).

* cited by examiner

BLOWER DEVICE FOR A RESPIRATORY PROTECTION SYSTEM

STATE OF THE ART

The invention concerns a blower device for a respiratory protection system.

A blower device for a respiratory protection system, with a fan for generating an airflow and with at least one filter element that is configured to be flowed through by the airflow, has already been proposed.

The objective of the invention is in particular to provide a generic device with improved characteristics regarding a compactness and a comfort. The objective is achieved according to the invention by the features of patent claim 1 while advantageous implementations and further developments of the invention may be gathered from the subclaims.

Advantages of the Invention

The invention is based on a blower device for a respiratory protection system, with a fan for generating an airflow and with at least one filter element that is configured to be flowed through by the airflow.

It is proposed that the fan is arranged at least partly beside the at least one filter element, wherein the airflow is deflected between the fan and the filter element. Preferably the filter element and the fan are arranged in a common housing. Preferentially the housing forms defined ducts for guiding the airflow. Preferably the airflow between the fan and the filter element is deflected by at least 50°, preferentially by at least 90°, preferably by at least 140° and particularly preferably by at least 180°. The blower device is in particular implemented by a compact blower device. The blower device is in particular configured to be worn on the body, for example on the back and/or on the hip.

By a "blower device" is in particular, in this context, a device to be understood which is configured for an active generation of an airflow for supplying a user with breathing air. The blower device is in particular configured, in an operation, for feeding the airflow to a mouth protection device of the respiratory protection system. The blower device is preferentially connected with the mouth protection device of the respiratory protection system via at least one breathing air supply line. Preferably the blower device is configured, in an operation, for suctioning air from an environment, for purifying, in particular filtering, the air and for feeding the purified air to a user actively, in particular via the mouth protection device. Preferably the blower device is configured for generating an active airflow. The blower device is in particular configured for generating a positive-pressure airflow. The fan is in particular, in an operation, configured for an active suctioning of air from an environment and for an active transport of the air to the mouth protection device of the respiratory protection system. The fan is in particular implemented by an axial fan and/or radial fan. By a "filter element" is in particular, in this context, an element to be understood which is configured, in an operation, for a filtering of the airflow. For this purpose the filter element preferably comprises a filter, which is in an operation flowed through by the airflow. Preferentially the airflow flows through the filter of the filter element completely. The filter element is in particular configured for separating off particles, in particular suspended matter, from the airflow. Herein different filters are conceivable which are deemed expedient by someone skilled in the art. Preferably the filter of the filter element is in particular implemented by a suspended-matter filter. Preferably the filter is embodied as a depth filter or cake filter, in particular as a lamellate filter.

By "the fan being arranged at least partly beside the at least one filter element" is in particular to be understood, in this context, that, in a direction that is perpendicular to a main extension plane of the fan, the fan is free from a complete cover by the filter element. Preferentially a normal vector of the main extension plane of the fan, which extends through a geometric center of the fan, is free of an intersection point with the filter element. Preferably the fan and the filter element are arranged side by side in a main extension plane of the blower device. Preferentially, viewed perpendicularly to the main extension plane of the blower device, the fan and the filter element are implemented to be at least substantially free, in particular completely free, of a mutual covering. By a "main extension plane" of a structural unit is in particular a plane to be understood which is parallel to a largest side face of a smallest imaginary rectangular cuboid just still completely enclosing the structural unit, and which in particular extends through the center point of the rectangular cuboid. "At least substantially" is in particular to mean, in this context, that a deviation from a given value is in particular less than 25%, preferably less than 10% and particularly preferably less than 5% of the given value.

By the "airflow being deflected between the fan and the filter element" is in particular to be understood, in this context, that in an operation of the blower device the airflow changes its direction on its way between the filter element and the fan. The "direction" of the airflow is in particular to mean, in this context, an averaged movement direction of the particles of the airflow in a point. Preferably a guide duct is arranged between the filter element and the fan, which is configured for guiding the airflow, wherein the guide duct is configured for a defined deflection of the airflow. Preferentially the guide duct forms a deflection between the filter element and the fan. The deflection may, for example, be effected in the shape of a curve, a bending, a kink, or the like. Preferably an inflow axis and/or an inflow direction of the airflow into the guide duct is essentially different and/or substantially offset from an outflow axis and/or an outflow direction of the airflow out of the guide duct. "Configured" is in particular to mean specifically programmed, designed and/or equipped. By an object being configured for a certain function is in particular to be understood that the object fulfills and/or executes said certain function in at least one application state and/or operation state.

The implementation according to the invention in particular enables providing an advantageously compact, in particular flat, blower device. It is in particular possible to do without a direct stacking of the fan and the filter unit. This in particular allows achieving an advantageously small construction height of the blower device.

Furthermore it is proposed that a flow-through direction of the airflow through the filter element is substantially different from a flow-through direction of the airflow through the fan. Preferably the flow-through direction of the airflow through the fan is perpendicular or parallel to a main extension plane of the fan. Preferably the flow-through direction of the airflow through the filter element is perpendicular to a main extension plane of the filter element. Preferentially the flow-through direction of the filter element is angled relative to the flow-through direction of the fan by at least 50°, preferably by at least 90°, preferentially by at least 140° and especially preferentially by at least 180°. Preferably the flow-through direction of the filter element is at least approximately opposed to the flow-through direction of the fan. In this way in particular a deflection of the airflow is achievable. Preferentially this in particular enables providing an advantageously compact, in particular flat-built, blower device. It is in particular possible to avoid direct stacking of the fan and the filter unit. As a result, in particular an advantageously small construction height of the blower device is achievable.

It is moreover conceivable that the flow-through direction of the airflow through the filter element is at least substantially opposed to the flow-through direction of the airflow through the fan. “At least substantially opposed” is in particular to mean, in this context, that a direction vector of the flow-through direction of the airflow through the fan includes a smallest angle of at least 140°, preferably at least 160° and particularly preferably at least approximately 180° with the direction vector of the flow-through direction of the airflow through the filter element. In this way in particular an advantageous side-by-side arrangement of the fan and the filter element is achievable. As a result, it is in particular possible to provide an advantageously compact, in particular flat-built, blower device. In particular, direct stacking of the fan and the filter unit is avoidable. In this way in particular an advantageously small construction height of the blower device is achievable.

It is further proposed that the at least one filter element has a main extension plane and the fan has a main extension plane, wherein a distance from the main extension plane of the filter element to the main extension plane of the fan is smaller than a maximum thickness of the filter element. The filter element preferably extends parallel to the fan. Preferentially a distance from the main extension plane of the filter element to the main extension plane of the fan is smaller than 50 mm, preferably smaller than 30 mm and particularly preferably smaller than 10 mm. The main extension plane of the filter element and the main extension plane of the fan are preferably arranged in a plane. In this way in particular an advantageously compact arrangement of the fan and the filter element is achievable. This in particular enables providing an advantageously compact, in particular flat-built, blower device.

Moreover it is proposed that the at least one filter element has a main extension plane and the fan has a main extension plane, wherein at least a large portion of normal vectors of the main extension plane of the filter element, which intersect with the filter element, is free of an intersection point with the fan. Preferentially all normal vectors of the main extension plane of the filter element, which intersect with the filter element, are free of an intersection point with the fan. The filter element and the fan may in particular be arranged side by side and parallel to one another, as well as side by side and partly angled relative to one another. An angle between the main extension plane of the filter element and the main extension plane of the fan is preferentially greater than 80°, preferably greater than 120° and particularly preferably greater than 160°. By “at least a large portion of normal vectors, which intersect with the filter element” at least such normal vectors are to be understood which intersect with more than 50%, preferably more than 70% and particularly preferably more than 90% of a main extension area of the filter element. In this way in particular an advantageously compact arrangement of the fan and the filter element is achievable. This in particular enables providing an advantageously compact, in particular flat-built, blower device.

It is also proposed that the blower device comprises a further filter element, which is arranged beside the fan and/or beside the one filter element and whose flow-through direction of the airflow differs from a flow-through direction of the airflow through the fan and/or through the filter element. Preferentially the further filter element is arranged beside the fan and beside the filter element. Furthermore the flow-through direction of the airflow through the further filter element preferably differs from a flow-through direction of the airflow through the fan. In this way in particular an advantageously compact arrangement of the fan, the filter element and the further filter element is achievable. This in particular enables providing an advantageously compact, in particular flat-built, blower device.

Furthermore it is proposed that the at least one filter element has a main extension plane and the fan has a main extension plane, wherein the main extension plane of the filter element is angled relative to the main extension plane of the fan. Preferably an angle between the main extension plane of the filter element and the main extension plane of the fan is greater than 45°, preferentially greater than 60° and especially preferentially greater than 75°. Preferably a normal vector of the main extension plane of the filter element, which intersects with the filter element, and a normal vector of the main extension plane of the fan, which intersects with the fan, include an angle of maximally 90° and minimally 5°. An intersection line of the main extension plane of the filter element and the main extension plane of the fan preferably extends at least in a proximity of the filter element and the fan. A smallest distance between the intersection line and the filter element is in particular smaller than 15 cm, preferentially smaller than 10 cm and especially preferentially smaller than 5 cm. In this way in particular an advantageously compact arrangement of the fan and the filter element is achievable. This in particular enables providing an advantageously compact, in particular flat-built, blower device.

Beyond this it is proposed that the blower device comprises a housing unit, which accommodates the fan and the at least one filter element and has a thickness of less than 70 mm. Preferably the housing unit has a thickness of less than 50 mm. The housing unit in particular serves for a protection and an orientation of the fan and of the filter element. Preferentially the blower device further comprises an energy storage for an energy supply of the fan, which is also accommodated in the housing unit. A “thickness” of the housing unit is in particular to mean, in this context, a maximum extension of the housing unit perpendicularly to a main extension plane of the housing unit. This in particular enables providing an advantageously compact blower device.

It is also proposed that the fan is configured for a generation of a volumetric flow rate of the airflow of at least 50 l/min and maximally 250 l/min. Preferentially the fan is configured for a generation of a volumetric flow rate of the airflow of at least 80 l/min and maximally 120 l/min. This in particular enables providing an advantageously compact high-performance blower device.

Furthermore it is proposed that the fan has at least one inlet, through which the airflow is sucked into the fan, wherein a flow-in direction of the airflow into the fan is at least substantially opposed to a flow-in direction of the airflow into the filter element. In particular, the fan is implemented by a radial fan, such that air is sucked axially into the fan. An axis of rotation of the fan extends in particular at least substantially perpendicularly to a main extension plane of the filter element. The airflow in particular flows through the filter element, is then deflected towards the fan, preferably on a rear wall of the housing unit, and is then sucked into the fan in the region of the fan perpendicularly to the rear wall. An airflow flowing into the filter element therefore in particular flows towards the rear wall, while the air flow flowing into the fan is oriented away from the rear wall. The flow-in direction of the airflow into the fan is angled relative to the flow-in direction of the airflow into the filter element, in particular by at least 100°, preferably at least 120° and more preferably at least 140°. The flow-in direction of the airflow into the fan is in particular angled by at least approximately 170° with respect to the flow-in direction of the airflow into the filter element. In this way in particular an advantageous side-by-side arrangement of the fan and the filter element is achievable. As a result, it is in particular possible to provide an advantageously compact, in particular flat-built, blower device. In particular, direct stacking of the fan and the filter unit is avoidable. In this way in particular an advantageously small construction height of the blower device is achievable.

It is also proposed that the housing unit has a rear wall, having a flow guiding body which is provided to guide the airflow when flowing into the fan. The rear wall is formed in particular by a housing shell of the housing unit facing the user. In an operation, the rear wall of the housing unit in particular rests on a user's back. In this context, a "flow guiding body" is in particular to be understood as a volume body which is configured for a selective guidance and control of the airflow. The flow guiding body preferably protrudes into a flow channel of the airflow between the filter element and the fan. The flow guiding body is preferably configured to deflect an air flow, with an airflow in particular being calmed when deflected. The flow guiding body in particular has a flow guiding surface, which is provided to be flowed against by an airflow. The airflow is deflected from the flow guiding surface by at least 30°, preferably by at least 60° and particularly preferably by at least 90° towards an inlet of the fan. In this way in particular an advantageous side-by-side arrangement of the fan and the filter element is achievable. As a result, it is in particular possible to provide an advantageously compact, in particular flat-built, blower device. Preferably, an advantageously relaxed airflow into the fan can be implemented. In particular, an advantageous flow onto a flow sensor can be provided.

Beyond this it is proposed that the flow guiding body has a flow guiding wall which has, in a cross-section perpendicular to a flow-in direction of the fan, a spiral-sector-shaped course. A radius of the course of the flow guiding wall preferably decreases towards the inlet of the fan. A flow sensor is preferably arranged on an inlet side of the flow guiding wall. The flow guiding wall is in particular a wall of the flow guiding body facing the flow channel of the air flow. In particular, the flow guiding body is directly arranged next to the fan. The flow guiding body is preferably directly arranged next to the fan in a region of the inlet of the fan. As a result, it is in particular possible to provide an advantageously compact, in particular flat-built, blower device. Preferably, an advantageously relaxed air flow into the fan can be implemented. In particular, an advantageous flow onto a flow sensor can be provided.

The invention is furthermore based on a respiratory protection system, in particular a respiratory protection blower system, with the blower device and with at least one mouth protection device. It is proposed that the at least one blower device is configured for a generation of a positive pressure in the mouth protection device. Preferably the at least one blower device is configured for generating, in the mouth protection device, a positive pressure relative to an environment. A "respiratory protection system" is in particular to mean, in this context, a system with a blower device and with a mouth protection device, which is configured to actively provide an airflow for a breathing air supply of a user. The respiratory protection system is in particular configured, in an operation, to generate an airflow by means of a blower device, which is fed to the mouth protection device of the respiratory protection system. Preferentially the blower device is connected with the mouth protection device of the respiratory protection system via at least one breathing air supply line. Preferably the respiratory protection system is configured, in an operation, for suctioning air from an environment, for purifying, in particular filtering, the air and for actively feeding the purified air to a user by means of the mouth protection device. By a "mouth protection device" is in particular, in this context, a device to be understood which implements a mouth protection and which is configured to be worn at least on a mouth and/or nose region of a user. Preferentially the device is configured to form a breathing region in front of a user's mouth and/or nose region, which is in an operation continuously supplied with breathing air. Preferably the mouth protection device is configured to supply a user with breathing air directly and to protect the user's mouth and/or nose region from external influences, in particular from gases, particles and/or suspended matter. Preferentially the mouth protection device is free of a covering a user's eyes, in particular of a user's eye area. Preferably the mouth protection device comprises a mask base body, which is configured to cover a user's mouth and/or nose region and which at least partly delimits a breathing region, and comprises at least one breathing air supply line that is connected with the mask base body and delimits at least one breathing air duct, which opens into the breathing region and is configured for guiding an active breathing airflow.

This in particular enables providing an advantageously comfortable respiratory protection system. In particular, a reliable supply with breathing air is achievable.

Moreover it is proposed that the respiratory protection system comprises a vest that is to be worn by a user, on the back of which the blower device is arranged. Preferentially the blower device is releasably connected with the vest. This in particular allows ensuring an advantageously comfortable wearing of the respiratory protection system. Furthermore it is in particular possible to achieve an advantageous arrangement of the blower device. In particular, a slipping of the blower device can be avoided.

Beyond this it is proposed that the respiratory protection system comprises an external operating unit comprising at least one operating element and at least one control and/or regulation unit, which is configured for a control and/or regulation of the blower device. Preferably the external operating unit is connected with the blower device via a radio connection and/or by a cable. The external operating unit is in particular implemented by a remote control. It would however also be conceivable that the external operating unit is implemented with a smartphone or something like that. By an "operating unit" is here in particular a unit to be understood which comprises at least one operating element that is directly operable by a user, and which is configured for influencing and/or changing a process and/or a state of a unit that is coupled with the operating unit by an activation and/or by entering parameters. By an "operating element" is in particular an element to be understood which is configured, in an operating process, to receive an input parameter from a user and in particular to be contacted by a user directly, wherein a touching of the operating element is sensed and/or an activation force applied to the operating element is sensed and/or is mechanically transmitted for an activation of a unit. A "control and/or regulation unit" is in particular to mean a unit with at least one control electronics part. A "control electronics part" is in particular to mean a unit with a processor unit and with a memory unit and with an operation program that is stored in the memory unit. In this way in particular an advantageously comfortable controlling of the blower device is achievable.

It is further proposed that the external operating unit comprises at least one sensor unit for capturing at least one environment parameter, wherein the control and/or regulation unit is configured, in at least one operation state, for a control and/or regulation of the blower device on the basis of the at least one environment parameter. Different environment parameters which are deemed expedient by someone skilled in the art are conceivable.

Preferentially, for example, an air quality, an ambient pressure, an oxygen concentration or something similar is captured by the sensor unit. The external operating unit is in particular configured to be worn by a user on his chest. It is thus in particular possible to capture environment parameters in a user's head region by means of the sensor unit. By a "sensor unit" is in particular, in this context, a unit to be understood which is configured to record at least one parameter and/or a physical characteristic, wherein the recording may take place actively, in particular by generating and emitting an electric measurement signal, and/or passively, in particular by capturing changes in a characteristic of a sensor component. Different sensor units which are deemed expedient by someone skilled in the art are conceivable. This in particular enables achieving a sensible control and/or regulation of the blower device. In particular, an adapted operation of the blower device is achievable. It would furthermore be conceivable that a user may be warned, for example of dangerous situations.

The blower device according to the invention, the respiratory protection system and/or the external operating unit are/is herein not to be limited to the application and implementation described above. In particular, for the purpose of fulfilling a functionality that is described here, the blower device according to the invention, the respiratory protection system and/or the external operating unit may comprise a number of individual elements, structural components and units that differs from a number that is given here. Moreover, regarding the value ranges given in the present disclosure, values situated within the limits mentioned shall also be considered to be disclosed and to be insertable as applicable.

DRAWINGS

Further advantages will become apparent from the following description of the drawings. The drawings show two exemplary embodiments of the invention. The drawings, the description and the claims contain a plurality of features in combination. Someone skilled in the art will purposefully also consider the features individually and will find further expedient combinations.

Figure 2:
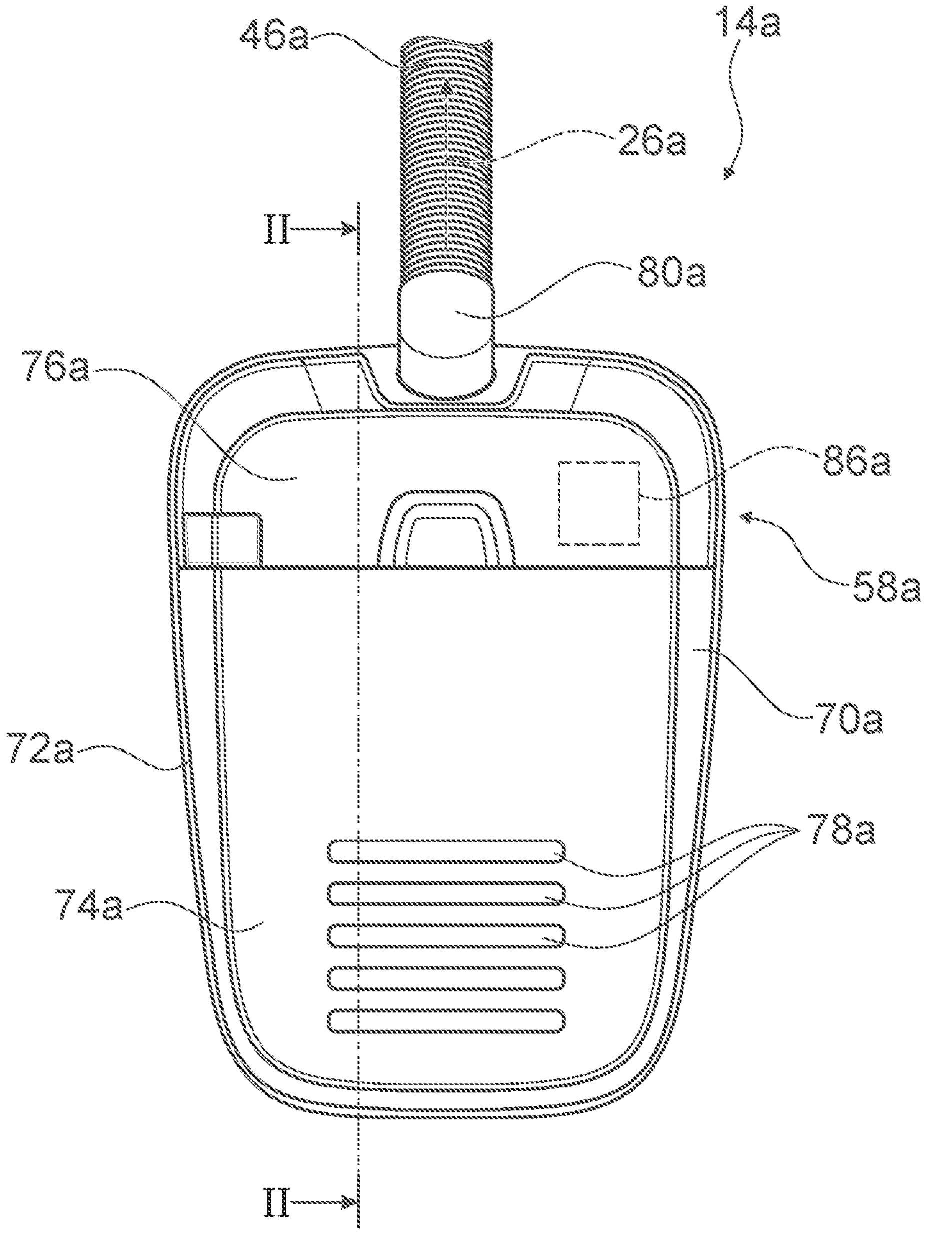
Figure 3:
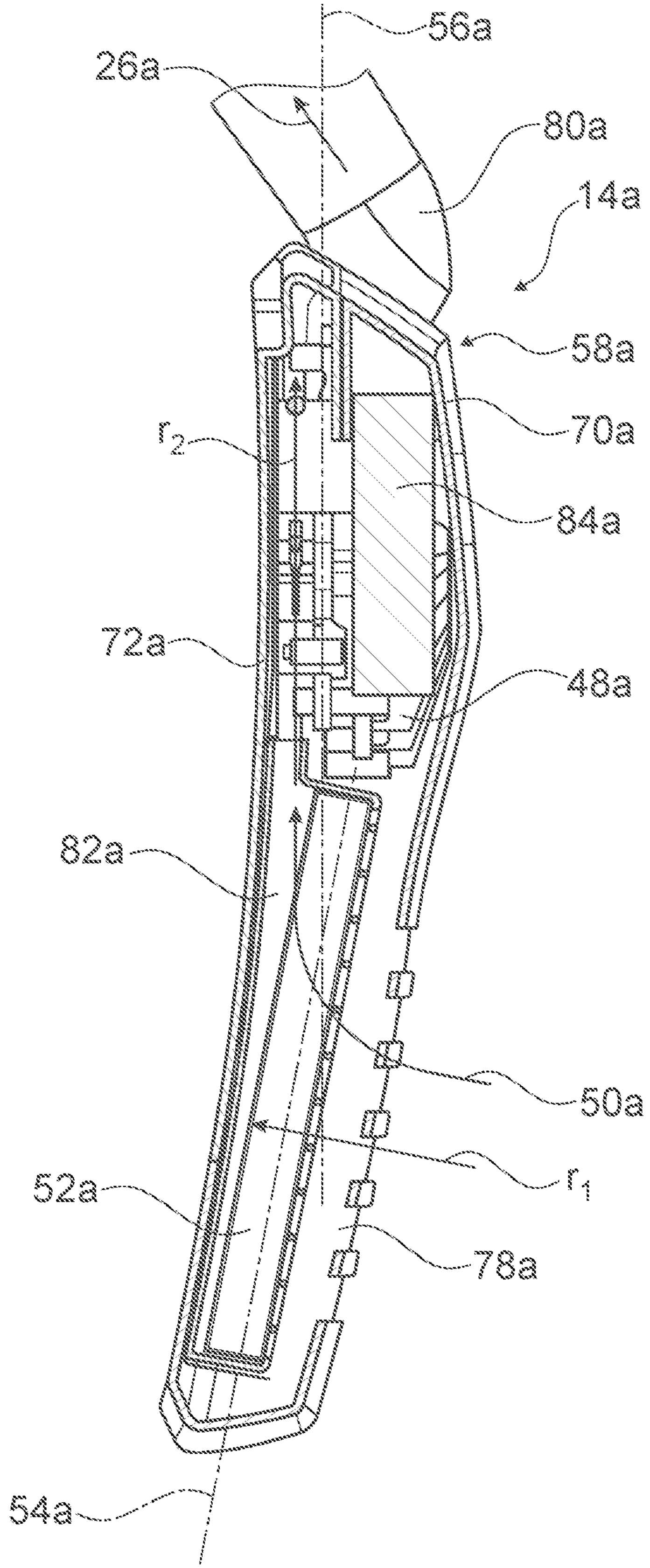

It is shown in:

FIG. 1 a respiratory protection system with a blower device, with a mouth protection device, with a vest and with an external operating unit, and a user, in a schematic representation, FIG. 2 the blower device of the respiratory protection system in a schematic plan view, FIG. 3 the blower device of the respiratory protection system, with a fan and with a filter element, in a schematic sectional view along the section line II-II.

Figure 4:
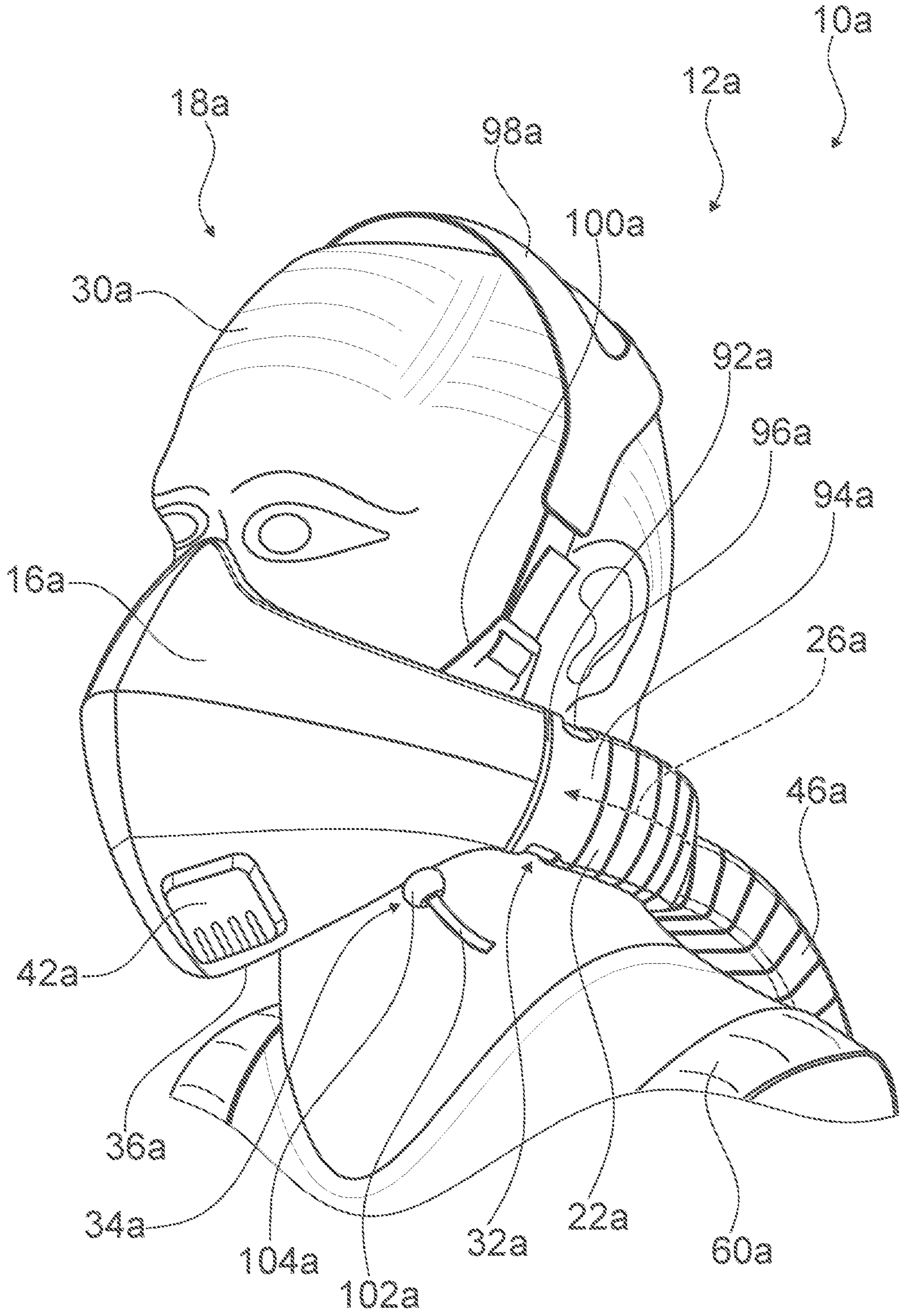
Figure 5:
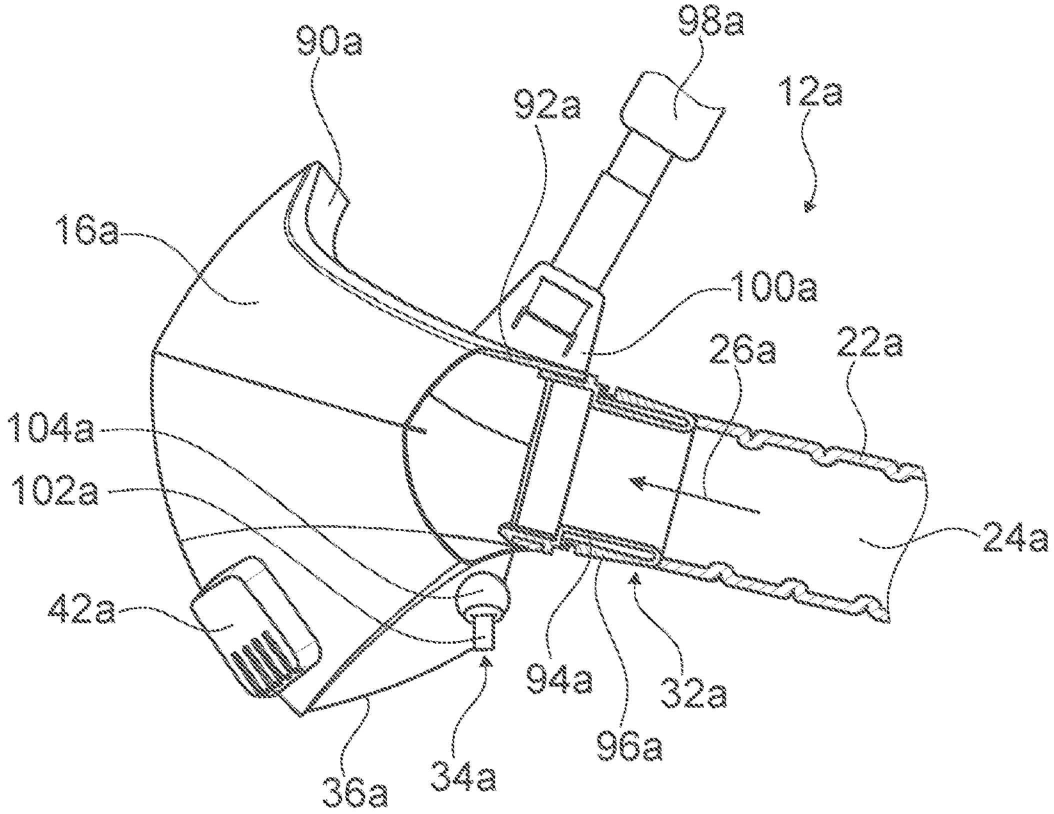
Figure 6:
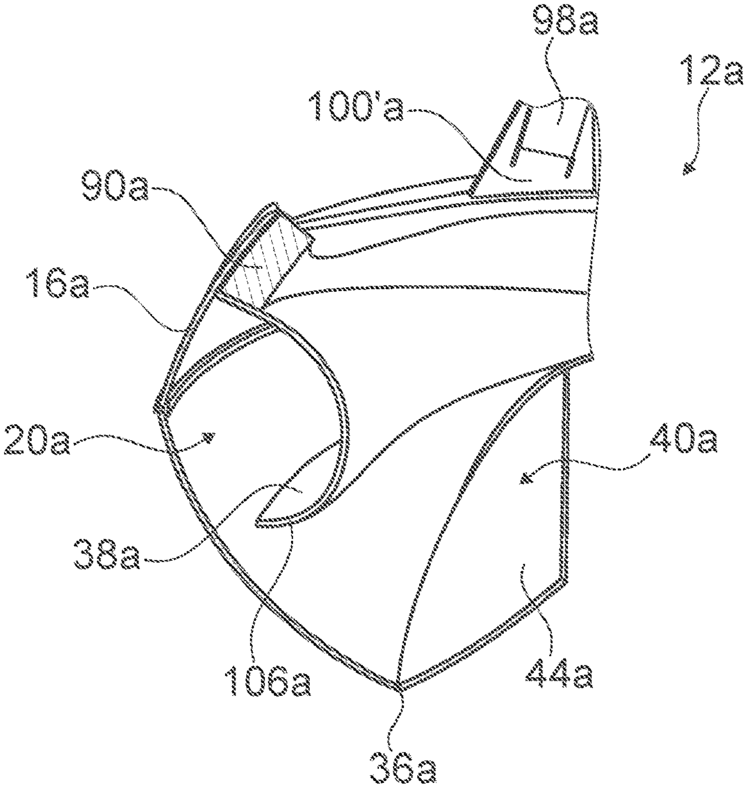
Figure 7:
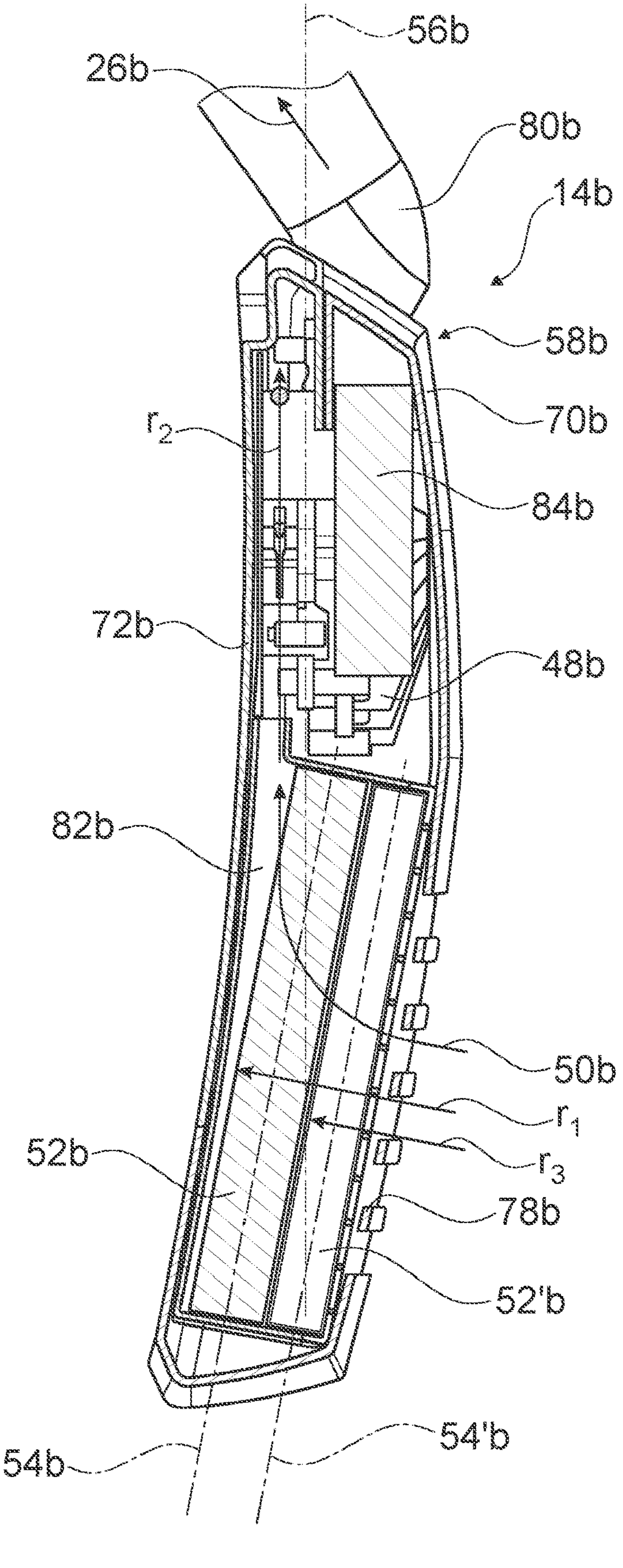
Figure 8:
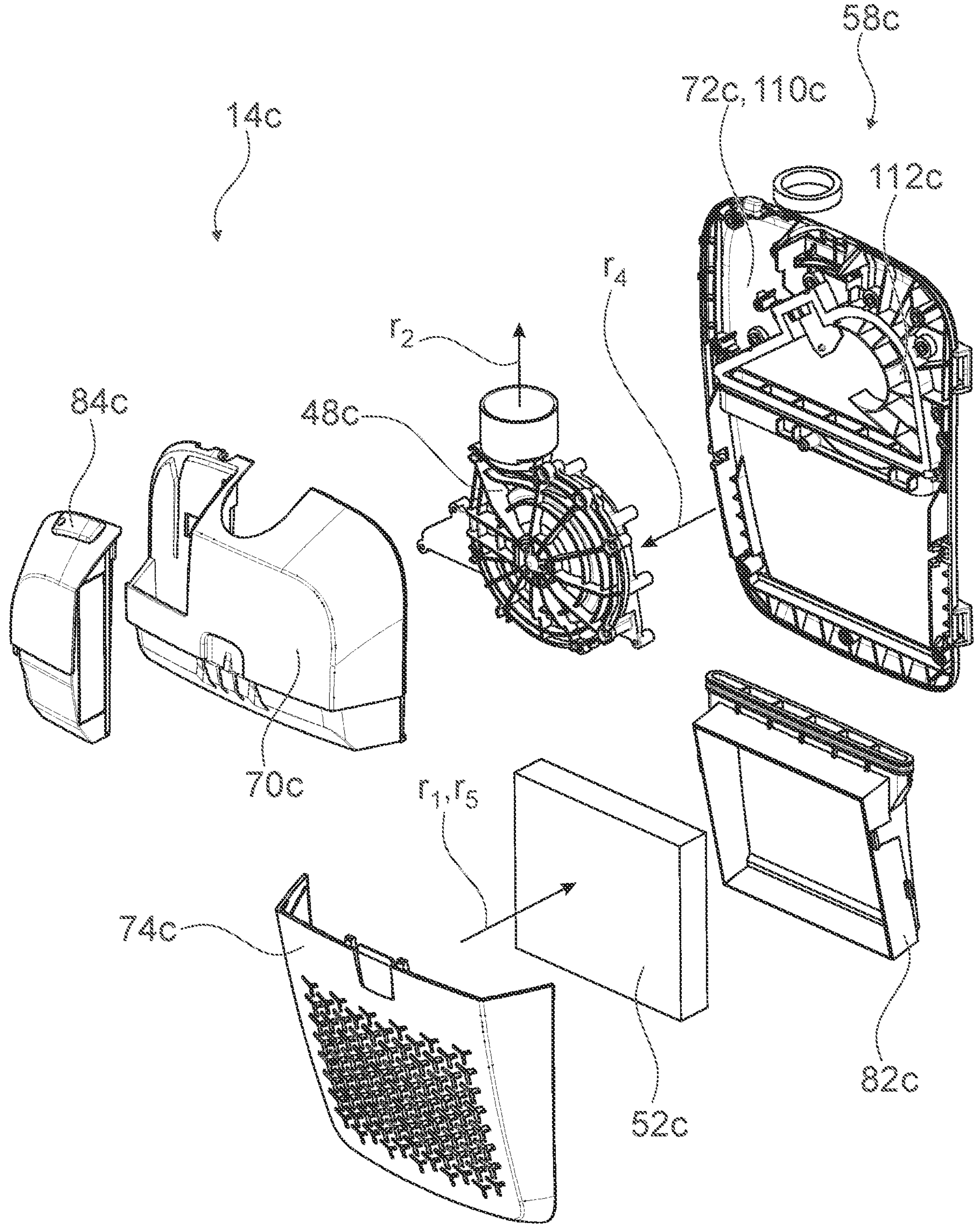
Figure 9:
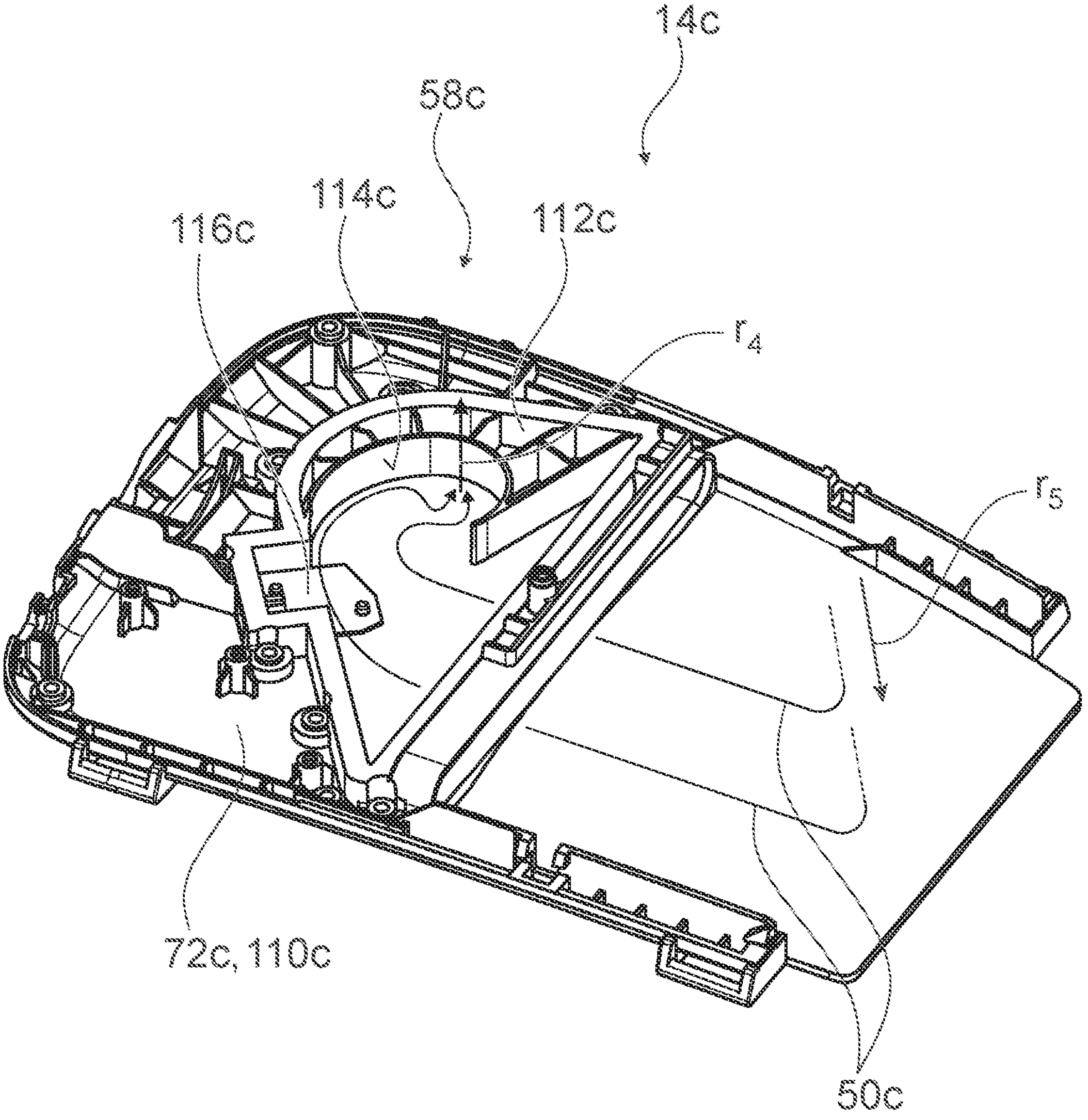
Figure 10:
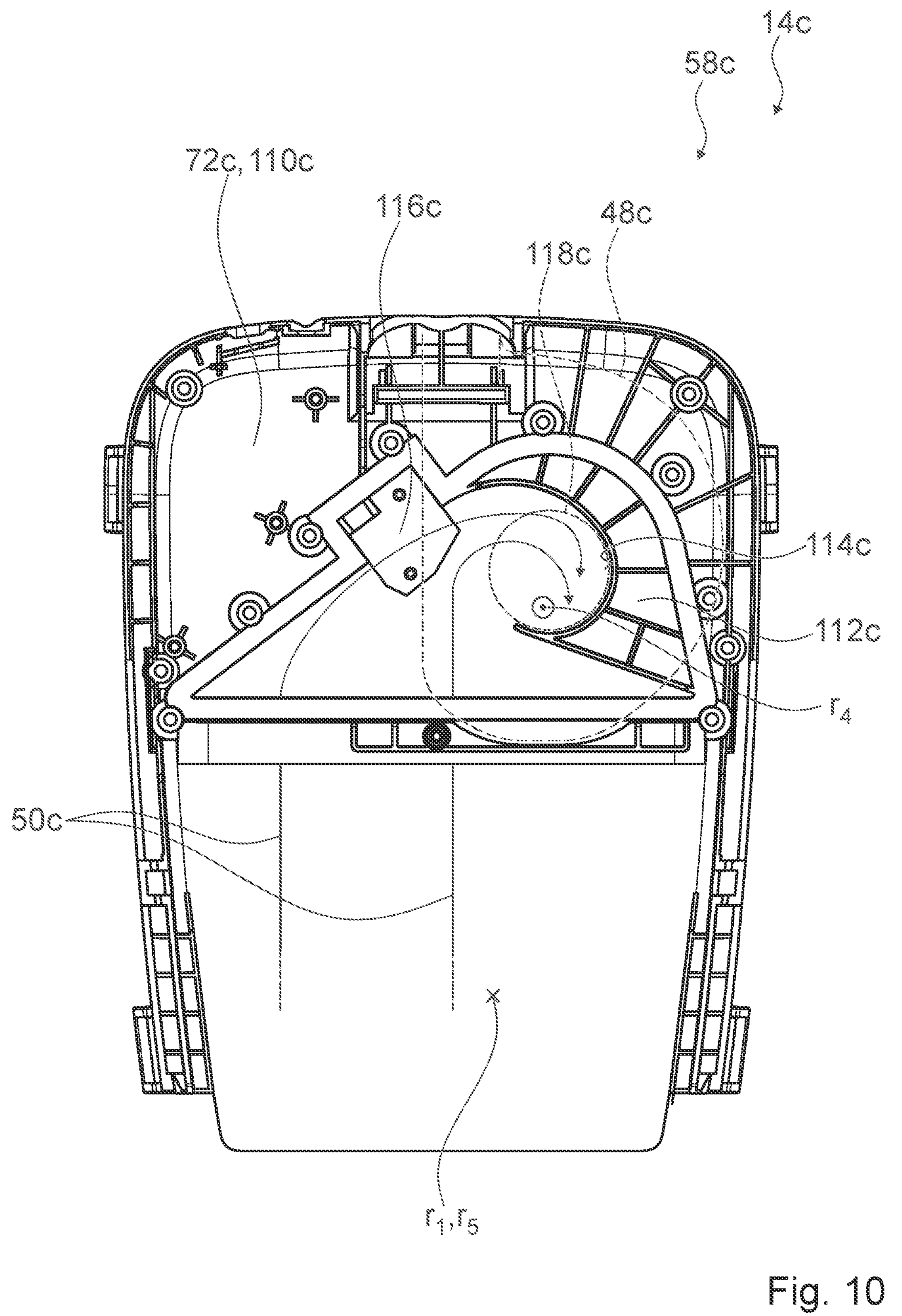

FIG. 4 the mouth protection device of the respiratory protection system and a user's head in a schematic representation, FIG. 5 the mouth protection device of the respiratory protection system in a schematic partial sectional view, FIG. 6 a partial section of the mouth protection device of the respiratory protection system in a schematic sectional view, FIG. 7 an alternative blower device of a respiratory protection system, with a fan, with a filter element and with a further filter element, in a schematic sectional view, FIG. 8 a further alternative blower device of a respiratory protection system, with a housing unit, with a fan and with a filter element, in a schematic exploded view, FIG. 9 a rear wall of the housing unit of the further alternative blower device with a flow guiding body, in a schematic representation, and FIG. 10 the rear wall of the housing unit of the further alternative blower device with the flow guiding body, in a schematic plan view.

DESCRIPTION OF THE EXEMPLARY EMBODIMENTS

FIG. 1 shows a respiratory protection system 10*a*. The respiratory protection system 10*a* is implemented by a respiratory protection blower system. The respiratory protection system 10*a* is in particular implemented by a respiratory protection blower system having the safety class TH3. The respiratory protection system 10*a* is configured for a protection of a user 18*a* from particles like smoke, aerosols and/or dust. Furthermore the respiratory protection system 10*a* is additionally capable of protecting from disgusting smells and toxic ozone. In particular it is conceivable that, in environments containing gases which are harmful to health or even toxic, the respiratory protection system 10*a* protects the user 18*a* from organic, inorganic and/or acidic gases. The respiratory protection system 10*a* comprises a blower device 14*a* and a mouth protection device 12*a*. The blower device 14*a* is configured for generating a breathing airflow 26*a*. The blower device 14*a* is configured for generating a breathing airflow 26*a* for the mouth protection device 12*a*.

The blower device 14*a* comprises a housing unit 58*a*. The housing unit 58*a* is implemented by a synthetic housing. The housing unit 58*a* comprises two interconnected housing shells 70*a*, 72*a*, namely a first housing shell 70*a* and a second housing shell 72*a*. The first housing shell 70*a* comprises two openable covers 74*a*, 76*a*, via which an inner space of the housing unit 58*a* can be made accessible. The second housing shell 72*a* forms a rear side of the housing unit 58*a*, which in a state when worn faces toward the user 18*a*. The second housing shell 72*a* is concavely curved on its outer side. The curvature of the second housing shell 72*a* is adapted to the curvature of a human back. Furthermore the housing unit 58*a* comprises a plurality of air inlet openings 78*a*. The air inlet openings 78*a* are formed by slits in the first housing shell 70*a*. In an operation the air inlet openings 78*a* serve for suctioning ambient air via an airflow 50*a*. The housing unit 58*a* further comprises an air outlet opening 80*a*. The air outlet opening 80*a* is formed by a hose connecting piece on the first housing shell 70*a*. In an operation the air outlet opening 80*a* serves for outputting the purified airflow 50*a*, in particular a breathing airflow 26*a*. In an operation the breathing airflow 26*a* is transferred from the air outlet opening 80*a* onwards to the mouth protection device 12*a* (FIGS. 1, 2).

The housing unit 58*a* has a thickness d of less than 70 mm. The housing unit 58*a* has a thickness d of less than 50 mm.

The blower device 14*a* moreover comprises a fan 48*a* for a generation of an airflow 50*a*. The blower device 14*a* is configured to generate a positive pressure in the mouth protection device 12*a*. The fan 48*a* is configured to generate a positive pressure in the mouth protection device 12*a*. The fan 48*a* is configured to generate a volumetric flow rate of the airflow 50*a* of at least 50 l/min and maximally 250 l/min. The fan 48*a* is configured to generate a volumetric flow rate of the airflow 50*a* of at least 80 l/min and maximally 120 l/min. In an operation the blower device 14*a* is configured to generate in the mouth protection device 12*a*, by means of the fan 48*a*, a relative positive pressure with respect to an environment. The fan 48*a* is implemented by an electric radial fan. Principally, however, another implementation deemed expedient by someone skilled in the art would also be conceivable. The fan 48*a* is arranged in the housing unit 58*a*. A main extension plane 56*a* of the fan 48*a* extends at least substantially parallel to a main extension plane of the housing unit 58*a*. The fan 48*a* is arranged in an upper region of the blower device 14*a*. The air outlet opening 80*a* is arranged on an output side of the fan 48*a*. The blower device 14*a* further comprises a control and/or regulation unit 86*a* for a controlling and/or regulation of the fan 48*a* in an operation. The control and/or regulation unit 86*a* is in particular configured for an automatic adaption of a performance level of the fan 48*a*. The control and/or regulation unit 86*a* is configured to adjust an airflow level of the fan 48*a* depending on a saturation of a filter element 52*a*. Furthermore the control and/or regulation unit 86*a* is in particular configured for an automatic airflow control and airflow adaption (FIG. 3).

The blower device 14*a* further comprises the filter element 52*a*. The filter element 52*a* is configured to be flown through by the airflow 50*a*. The filter element 52*a* is implemented by a rectangular-cuboid-shaped filter module. The filter element 52*a* is implemented by a suspended-matter filter. The filter element 52*a* is embodied as a depth filter, in particular a lamellate filter. However, it would also be conceivable for the filter element 52*a* to be embodied as a gas filter, in particular as an A1B1E1 gas filter. The filter element 52*a* is arranged in the housing unit 58*a*. A main extension plane 54*a* of the filter element 52*a* extends at least substantially parallel to a main extension plane of the housing unit 58*a*. The filter element 52*a* is arranged in a lower region of the blower device 14*a*. The housing unit 58*a* accommodates the fan 48*a* and the filter element 52*a*. The air inlet opening 78*a* is arranged on an entry side of the filter element 52*a*. Furthermore the filter element 52*a* is implemented in such a way that it is exchangeable via the cover 74*a* (FIG. 3).

The fan 48*a* is arranged beside the filter element 52*a*, wherein the airflow 50*a* is deflected between the fan 48*a* and the filter element 52*a*. The filter element 52*a* and the fan 48*a* are together arranged in the housing unit 58*a*. The housing unit 58*a* comprises an air guide duct 82*a*, which accommodates the filter element 52*a* and is configured for guiding the airflow 50*a* between the filter element 52*a* and the fan 48*a*. In terms of fluid dynamics, the filter element 52*a* is arranged before the fan 48*a* along the airflow 50*a*. The airflow 50*a* between the fan 48*a* and the filter element 52*a* is deflected by at least approximately 90°. A deflection of the airflow 50*a* is effected in the air guide duct 82*a*. It would, however, also be conceivable that an air guide duct 82*a* may be dispensed with. A flow-through direction $r_1$ of the airflow 50*a* through the filter element 52*a* is substantially different from a flow-through direction $r_2$ of the airflow 50*a* through the fan 48*a*. The flow-through direction $r_2$ of the airflow 50*a* through the fan 48*a* extends parallel to the main extension plane 56*a* of the fan 48*a*. In case of an implementation of the fan 48*a* as an axial fan, it would also be conceivable that the flow-through direction $r_2$ of the airflow 50*a* through the fan 48*a* extends perpendicularly to the main extension plane 56*a* of the fan 48*a*. The flow-through direction $r_1$ of the airflow 50*a* through the filter element 52*a* extends perpendicularly to the main extension plane 54*a* of the filter element 52*a*. The flow-through direction $r_1$ of the filter element 52*a* is angled by at least approximately 90° relative to the flow-through direction $r_2$ of the fan 48*a* (FIG. 3).

The filter element 52*a* has the main extension plane 54*a*. The fan 48*a* has the main extension plane 56*a*. It would be conceivable for the main extension plane 54*a* to extend parallel to the main extension plane 56*a*, wherein a distance from the main extension plane 54*a* of the filter element 52*a* to the main extension plane 56*a* of the fan 48*a* is smaller than a maximum thickness of the filter element 52*a*. Preferably, in a parallel implementation a distance from the main extension plane 54*a* of the filter element 52*a* to the main extension plane 56*a* of the fan 48*a* would be smaller than 50 mm, preferentially smaller than 30 mm and especially preferentially smaller than 10 mm. In the illustrated implementation the main extension plane 54*a* of the filter element 52*a* is angled relative to the main extension plane 56*a* of the fan 48*a*. An angle between the main extension plane 54*a* of the filter element 52*a* and the main extension plane 56*a* of the fan 48*a* is greater than 80°, preferably greater than 120° and particularly preferably greater than 160°. The angle between the main extension plane 54*a* of the filter element 52*a* and the main extension plane 56*a* of the fan 48*a* is at least approximately 165°. A normal vector of the main extension plane 54*a* of the filter element 52*a*, which intersects with the filter element 52*a*, and a normal vector of the main extension plane 56*a* of the fan 48*a*, which intersects with the fan 48*a*, include a smallest angle of at least approximately 15°. Preferentially the main extension plane 56*a* of the fan 48*a* and the main extension plane 54*a* of the filter element 52*a* include a smallest angle of at least 60°, preferably at least 70°, with an imaginary plane in which the intersection line between the main extension plane 56*a* of the fan 48*a* and the main extension plane 54*a* of the filter element 52*a* extends and which is situated symmetrically between the filter element 52*a* and the fan 48*a*. Preferentially an intersection line of the main extension plane 54*a* of the filter element 52*a* and the main extension plane 56*a* of the fan 48*a* extends in a proximity of the filter element 52*a* and the fan 48*a*. A smallest distance between the intersection line and the filter element 52*a* is in particular smaller than 15 cm, preferably smaller than 10 cm and particularly preferably smaller than 5 cm. A smallest distance between the intersection line and the filter element 52*a* is smaller than a smallest distance between the fan 48*a* and the filter element 52*a*. At least a large portion of normal vectors of the main extension plane 54*a* of the filter element 52*a*, which intersect with the filter element 52*a*, are free of an intersection point with the fan 48*a*. All normal vectors of the main extension plane 54*a* of the filter element 52*a*, which intersect with the filter element 52*a*, are free of an intersection point with the fan 48*a*. The filter element 52*a* and the fan 48*a* are arranged, at least partially angled relative to one another, side by side (FIG. 3).

Beyond this the blower device 14*a* comprises an energy storage 84*a*. The energy storage 84*a* is implemented by a rechargeable battery. The energy storage 84*a* serves for an energy supply of the fan 48*a*. A main extension plane of the energy storage 84*a* extends at least substantially parallel to a main extension plane of the housing unit 58*a*. The energy storage 84*a* is arranged in a lower region of the blower device 14*a*. The housing unit 58*a* accommodates the fan 48*a*, the filter element 52*a* and the energy storage 84*a*. The housing unit 58*a* serves for a protection and an orientation of the fan 48*a*, the filter element 52*a* and the energy storage 84*a*. The energy storage 84*a* is furthermore implemented in such a way that it is exchangeable via the cover 76*a* (FIG. 3).

The respiratory protection system 10*a* further comprises an external operating unit 62*a*. The external operating unit 62*a* is implemented by a remote control. The operating unit 62*a* comprises operating elements 64*a* and a control and/or regulation unit 66*a*, which is configured for a control and/or regulation of the blower device 14*a*. The external operating unit 62*a* is exemplarily connected with the blower device 14*a* by a cable 88*a*. The control and/or regulation unit 66*a* of the external operating unit 62*a* is in particular configured to actuate the control and/or regulation unit 86*a* of the blower device 14*a* depending on an input at the operating elements 64*a*. It is for example possible to set a performance level of the fan 48*a* via the operating elements 64*a*. It is furthermore possible to activate or deactivate the fan 48*a* via the operating elements 64*a*. The external operating unit 62*a* moreover comprises a sensor unit 68*a* for capturing environment parameters. The control and/or regulation unit 66*a* is configured, in at least one operation state, for a control and/or regulation of the blower device 14*a* on the basis of the environment parameters. The control and/or regulation unit 66*a* is configured, in an operation, to actuate the control and/or regulation unit 86*a* of the blower device 14*a*, wherein a performance level of the fan 48*a* is adapted on the basis of the environment parameters by means of the control and/or regulation unit 86*a* of the blower device 14*a*. The sensor unit 68*a* is configured to capture an air quality, an ambient pressure and/or an oxygen concentration.

The respiratory protection system 10*a* further comprises a vest 60*a* that is to be worn by a user 18*a*. The vest 60*a* is implemented by a fabric vest. The blower device 14*a* is arranged on a rear side of the vest 60*a*. In an operation, the blower device 14*a* is worn by a user 18*a* on his back by means of the vest 60*a*. In an operation, the blower device 14*a* is worn by a user 18*a* on his back by means of the vest 60*a*. The external operating unit 62*a* is furthermore configured to be worn by a user 18*a* on his chest. The external operating unit 62*a* is arranged on a front side of the vest 60*a*. It is therefore possible that environment parameters are captured in a head region of the user 18*a* via the sensor unit 68*a*.

The respiratory protection system 10*a* further comprises a breathing air line 46*a*, which is configured for guiding the breathing airflow 26*a*. The breathing air line 46*a* connects the blower device 14*a* with the mouth protection device 12*a*. The breathing air line 46*a* is connected with the blower device 14*a* via the air outlet opening 80*a* of the blower device 14*a*. The breathing air line 46*a* is implemented by a hose. In an operation the breathing air line 46*a* is configured for guiding the breathing airflow 26*a*.

The mouth protection device 12*a* comprises a mask base body 16*a*. The mask base body 16*a* is configured for covering a mouth and nose region of the user 18*a*. Furthermore the mask base body 16*a* is configured to at least partially delimit a breathing region 20*a*. In an operation the mask base body 16*a*, together with the face of the user 18*a* and a separation layer 38*a*, delimits the breathing region 20*a*. The mask base body 16*a* is implemented at least to a large extent of a flexurally soft material. The mask base body 16*a* is completely implemented of a flexurally soft material. The mask base body 16*a* is completely implemented of a dimensionally unstable material. The mask base body 16*a* is implemented at least to a large extent of a textile material. The mask base body 16*a* is completely implemented of a textile material. The mask base body 16*a* is made of a textile. The mask base body 16*a* is completely implemented of a textile. The mask base body 16*a* is implemented to be at least substantially airtight. It would in particular be conceivable that a textile of which the mask base body 16*a* is made comprises a coating which at least reduces an air permeability. The mask base body 16*a* is airtight in particular at least at an absolute pressure of 1 bar, preferably at least 2 bar and particularly preferably at least 3 bar (FIG. 4).

The mouth protection device 12*a* further comprises a sealing element 90*a*. The sealing element 90*a* is fixedly connected with the mask base body 16*a*. The sealing element 90*a* is arranged at an upper edge of the mask base body 16*a*. The sealing element 90*a* is configured for sealing the mask base body 16*a*, at least at an upper edge of the mask base body 16*a*, against the face of the user 18*a*. The sealing element 90*a* is configured for sealing the breathing region 20*a* and an outlet region 40*a* toward the eyes of the user 18*a*, in order to avoid an airflow into the eyes of the user 18*a*. The sealing element 90*a* is made of a foam material. The sealing element 90*a* is implemented of a foam strip. The sealing element 90*a* is exemplarily glued with the mask base body 16*a* (FIG. 6).

Furthermore the mouth protection device 12*a* comprises a breathing air supply line 22*a*, which is connected with the mask base body 16*a*. The breathing air supply line 22*a* delimits a breathing air duct 24*a* which opens into the breathing region 20*a* and which is configured to guide the active breathing airflow 26*a*. The breathing air supply line 22*a* is implemented of an elastic hose. The breathing air supply line 22*a* exemplarily has an oval cross section. However, a different cross section of the breathing air supply line 22*a*, deemed expedient by someone skilled in the art, would also be conceivable, for example a circular cross section. The breathing air supply line 22*a* extends from the breathing air line 46*a* to the breathing region 20*a*.

The mouth protection device 12*a* also comprises a further breathing air supply line 22'*a*, which is redundant to the breathing air supply line 22*a* and is connected with the mask base body 16*a*. The further breathing air supply line 22'*a* delimits a further breathing air duct, which opens into the breathing region 20*a* and is configured for guiding an active breathing airflow 26*a*. The further breathing air supply line 22'*a* is implemented of an elastic hose. The further breathing air supply line 22'*a* exemplarily has an oval cross section. The further breathing air supply line 22'*a* extends from the breathing air line 46*a* to the breathing region 20*a*. The further breathing air supply line 22'*a* is arranged on a side of the mask base body 16*a* that faces away from the breathing air supply line 22*a*. The breathing air supply lines 22*a*, 22'*a* are configured to be guided past the head 30*a* of the user 18*a* on different sides of the head 30*a* of the user 18*a*. The further breathing air supply line 22'*a* has a function that is redundant to the breathing air supply line 22*a*. The further breathing air supply line 22'*a* serves to augment a safety of a supply with the breathing airflow 26*a*. The breathing air supply line 22*a* and the further breathing air supply line 22'*a* are each functional independently from one another.

The breathing air line 46*a* connected with the blower device 14*a* is configured for guiding the breathing airflow 26*a* to the breathing air supply lines 22*a*, 22'*a*. The breathing air line 46*a* is furthermore configured for dividing the breathing airflow 26*a* to the breathing air supply line 22*a* and the further breathing air supply line 22'*a*. The breathing air line 46*a* is coupled with the breathing air supply line 22*a* and the further breathing air supply line 22'*a* via a Tee connector piece 108*a*. The Tee connector piece 108*a* is configured to be arranged in a nape region of the user 18*a*.

The mouth protection device 12*a* further comprises a fixation strap 28*a* for a fixation of the mask base body 16*a* on the head 30*a* of the user 18*a*. The fixation strap 28*a* is implemented of an elastic strap, like in particular a rubber strap. The fixation strap 28*a* has a width which at least approximately corresponds to a width of the breathing air supply line 22*a*. Furthermore an effective length of the fixation strap 28*a* is implemented to be adjustable. The fixation strap 28*a* extends from a first end of the mask base body 16*a* to an opposite-situated second end of the mask base body 16*a*. The fixation strap 28*a* extends from a first end of the mask base body 16*a*, in which the breathing air supply line 22*a* is connected with the mask base body 16*a*, to an opposite-situated second end of the mask base body 16*a*, in which the further breathing air supply line 22'*a* is connected with the mask base body 16*a*. The fixation strap 28*a* is configured, in a state when the mouth protection device 12*a* is worn, to be guided around a back of the head, in particular in a nape region. The mouth protection device 12*a* comprises at least one connection unit 32*a* for a simultaneous plug connection of the fixation strap 28*a* and the at least one breathing air supply line 22*a*, 22'*a* with the mask base body 16*a*. The mouth protection device 12*a* comprises the connection unit 32*a* and a further connection unit, which is not shown, for a simultaneous plug connection of the fixation strap 28*a* respectively with the breathing air supply line 22*a* and the mask base body 16*a*, and with the further breathing air supply line 22'*a* and the mask base body 16*a*. The connection units 32*a* serve for pulling off or taking off the mouth protection device 12*a*. In the connection units 32*a* a coupling is effected, for example, by means of a plugging movement. The connection units 32*a* each comprise a first coupling element 92*a* and a second coupling element 94*a* that corresponds to the first coupling element 92*a*. The first coupling elements 92*a* of the connection units 32*a* exemplarily each form an interface receptacle, while the second coupling elements 94*a* of the connection units 32*a* each form an interface extension. The first coupling elements 92*a* of the connection units 32*a* are each fixedly connected with the mask base body 16*a* at opposite ends. The second coupling element 94*a* of the connection units 32*a* is fixedly connected with a first end of the fixation strap 28*a* and with the breathing air supply line 22*a*. The further second coupling element of the further connection unit is fixedly connected with a second end of the fixation strap 28*a* and with the further breathing air supply line 22'*a*. The first coupling elements 92*a* of the connection units 32*a* are respectively implemented of a hose connection. The first coupling elements 92*a* of the connection units 32*a* are respectively configured to latch with the second coupling elements 94*a* of the connection units 32*a*. The second coupling elements 94*a* of the connection units 32*a* each comprise actuation elements 96*a* for a releasing of the latch connection (FIGS. 1, 5).

The mouth protection device 12*a* comprises a head fixation strap 98*a* for an additional fixation of the mask base body 16*a* on the head 30*a* of the user 18*a*. Furthermore, an effective length of the head fixation strap 98*a* is implemented adjustable. The head fixation strap 98*a* extends from a first end of the mask base body 16*a* to an opposite-situated second end of the mask base body 16*a*. The head fixation strap 98*a* extends from a first end of the mask base body 16*a*, in which the breathing air supply line 22*a* is connected with the mask base body 16*a*, to an opposite-situated second end of the mask base body 16*a*, in which the further breathing air supply line 22'*a* is connected with the mask base body 16*a*. The head fixation strap 98*a* is configured, in a state when the mouth protection device 12*a* is worn, to be guided around a back of a head, in particular an upper head. The mouth protection device 12*a* comprises a fixation unit 100*a* and a further fixation unit 100'*a* for an adjustable fixation of the head fixation strap 98*a* with the mask base body 16*a* at its ends. For a fixation, the head fixation strap 98*a* is guided adjustably on the fixation units 100*a*, 100'*a* through recesses.

The mouth protection device 12*a* also comprises an adjustment unit 34*a*, wherein at least an effective length of a side edge 36*a* of the mask base body 16*a* is implemented to be at least partly adjustable by means of said adjustment unit 34*a*. An effective length of a side edge 36*a* from the first end of the mask base body 16*a*, in which the first coupling element 92*a* is arranged, to the second end of the mask base body 16*a*, in which the further first coupling element 92'*a* is arranged, is implemented to be adjustable by means of the adjustment unit 34*a*. The side edge 36*a* extends substantially parallel to a main extension direction of the mask base body 16*a*. The adjustment unit 34*a* comprises a cord 102*a*, in particular an elastic cord, as well as a cord clamp 104*a*. The cord 102*a* of the adjustment unit 34*a* extends in a duct of the mask base body 16*a* from the first end of the mask base body 16*a* to the second end of the mask base body 16*a*, which is situated opposite the first end. The cord 102*a* is fixated at the first end and the second end. An effective length of the cord 102*a*, and thus of the side edge 36*a* of the mask base body 16*a*, is implemented to be manually adjustable by means of the cord clamp 104*a*. In particular, an effective length of the cord 102*a* is implemented to be manually adjustable by way of different-sized loops of the cord 102*a* being formed by means of the cord clamp 104*a*.

The mouth protection device 12*a* furthermore comprises a separation layer 38*a*, which is connected with the mask base body 16*a* and is configured for at least partly separating the breathing region 20*a* from an outlet region 40*a*. The outlet region 40*a* is at least partially delimited by the mask base body 16*a*. The outlet region 40*a* is arranged below the breathing region 20*a*. In an operating state the mask base body 16*a* delimits, together with the face of the user 18*a*, a spatial region that is divided by the separation layer 38*a* into a breathing region 20*a* and an outlet region 40*a*. The separation layer 38*a* forms, together with the mask base body 16*a*, a duct which at least partially forms the breathing region 20*a* and which extends up to a middle region of the mouth protection device 12*a*. The duct formed by the separation layer 38*a* extends from the breathing air duct 24*a* and the further breathing air duct to a user's mouth and/or nose region. In the user's mouth and/or nose region the breathing region 20*a* merges into the outlet region 40*a*. The separation layer 38*a* is realized integrally with the mask base body 16*a*. The separation layer 38*a* protrudes, perpendicularly to the mask base body 16*a*, between the breathing region 20*a* and the outlet region 40*a*. The separation layer 38*a* has in a middle region a cutout 106*a*, which connects the breathing region 20*a* with the outlet region 40*a*. The separation layer 38*a* is at least substantially made of a textile material. The separation layer 38*a* is completely made of a textile. The separation layer 38*a* is configured for a defined guidance of air. The separation layer 38*a* is configured to guide the breathing airflow 26*a* past the mouth and/or nose region of a user 18*a* before reaching the outlet region 40*a*. For this purpose the separation layer 38*a* has in its middle region the cutout 106*a*, which connects the breathing region 20*a* with the outlet region 40*a*. In an operation, the breathing airflow 26*a* flows from the breathing air duct 24*a* and the further breathing air duct into the breathing region 20*a*, and from the breathing region 20*a* through the cutout 106*a* into the outlet region 40*a*. The cutout 106*a* is arranged in a proximity of the mouth and/or nose region of a user 18*a* (FIG. 6).

Beyond this the mouth protection device 12*a* comprises a discharge valve 42*a*, which is configured to regulate a pressure in the breathing region 20*a* to an at least approximately constant value. The discharge valve 42*a* is embodied by a positive-pressure valve, in particular a one-way positive-pressure valve, which is configured to open from a defined positive pressure in the breathing region 20*a*, respectively the outlet region 40*a*, relative to an environment. The discharge valve 42*a* is configured to permit, in particular to keep up, a defined positive pressure in the breathing region 20*a*. Preferably the discharge valve 42*a* is embodied by a mechanical valve. The mask base body 16*a* is not completely sealed against the face of the user 18*a* such that, besides the discharge valve 42*a*, there is a transition between the mask base body 16*a* and the face, where it is also possible for air to escape. In case of too much leakage or in case of the mouth protection device 12*a* taken off, the pressure in the breathing region 20*a* can no longer be kept up at the transition from the mask base body 16*a* to the face, and the pressure falls below the limit value of the discharge valve 42*a*. This can be captured by the blower device 14*a*, in particular on the basis of a load of the fan 48*a*, and a warning signal may be outputted to the user 18*a* if applicable. It is in this way possible that a faulty wearing of the mouth protection device 12*a* is indicated to the user 18*a*. Moreover, the fan 48*a* may thus stop automatically if the mouth protection device 12*a* is put on. Under regular conditions the pressure in the breathing region 20*a* is regulated to an approximately constant value by means of the discharge valve 42*a* (FIG. 4).

It is moreover conceivable that the mask base body 16*a* comprises a partial region 44*a*, which is implemented to be permeable to air. The partial region 44*a* is in particular made of an air-permeable textile. The partial region 44*a* is directly adjacent to the outlet region 40*a*. The partial region 44*a* serves for a defined discharge of air into the outlet region 40*a*. The partial region 44*a* is provided in addition to the discharge valve 42*a* but it would also be conceivable that only the partial region 44*a* is provided, the partial region 44*a* adopting the function of the discharge valve 42*a*.

FIGS. 7 to 10 show two further exemplary embodiments of the invention. The following description will be essentially limited to the differences between the exemplary embodiments, wherein regarding structural components, features and functions which remain the same the description of the exemplary embodiment of FIGS. 1 to 6 may be referred to. To distinguish between the exemplary embodiments, the letter a added to the reference numerals of the exemplary embodiment of FIGS. 1 to 6 has been substituted by the letters b and c in the reference numerals of the exemplary embodiments of FIGS. 7 to 10. In regard to structural components having the same denomination, in particular regarding structural components having the same reference numerals, principally the drawings and/or the description of the exemplary embodiment of FIGS. 1 to 6 may be referred to.

FIG. 7 shows a blower device 14*b* of a respiratory protection system. The blower device 14*b* is configured for a generation of a breathing airflow 26*b*. The blower device 14*b* is configured for a generation of a breathing airflow 26*b* for a mouth protection device.

The blower device 14*b* comprises a housing unit 58*b*. The housing unit 58*b* is embodied by a synthetic housing. The housing unit 58*b* comprises two interconnected housing shells 70*b*, 72*b*, namely a first housing shell 70*b* and a second housing shell 72*b*. The housing unit 58*b* has a thickness d of less than 70 mm.

Furthermore the blower device 14*b* comprises a fan 48*b* for generating an airflow 50*b*. The blower device 14*b* is configured to generate a positive pressure in the mouth protection device 12*b*. The fan 48*b* is configured to generate a positive pressure in the mouth protection device 12*b*. The fan 48*b* is embodied by an electric radial fan.

The blower device 14*b* further comprises a filter element 52*b*. The filter element 52*b* is configured to be flown through by the airflow 50*b*. The filter element 52*b* is implemented by a rectangular-cuboid-shaped filter module. The filter element 52*b* is embodied by a suspended-matter filter. The filter element 52*b* is embodied as a depth filter, in particular as a lamellate filter. A main extension plane 54*b* of the filter element 52*b* extends at least substantially parallel to a main extension plane of the housing unit 58*b*. The filter element 52*b* is arranged in a lower region of the blower device 14*b*. The housing unit 58*b* accommodates the fan 48*b* and the filter element 52*b*.

The blower device 14*b* also comprises a further filter element 52'*b*. The further filter element 52'*b* is configured to be flown through by the airflow 50*b*. The further filter element 52'*b* is configured to be flown through by the airflow 50*b* before the filter element 52*b*. The further filter element 52'*b* is implemented by a rectangular-cuboid-shaped filter module. The further filter element 52'*b* is implemented by an activated-carbon odor filter. A main extension plane 54'*b* of the further filter element 52'*b* extends at least substantially parallel to a main extension plane of the housing unit 58*b*. The further filter element 52'*b* is arranged in a lower region of the blower device 14*b*. The housing unit 58*b* accommodates the fan 48*b*, the filter element 52*b* and the further filter element 52'*b*. Air inlet openings 78*b* are arranged on an entry side of the further filter element 52'*b*. The further filter element 52'*b* is arranged on an entry side of the filter element 52*b*.

The fan 48*b* is arranged beside the filter element 52*b*, wherein the airflow 50*b* is deflected between the fan 48*b* and the filter element 52*b*. The further filter element 52'*b* is also arranged beside the fan 48*b*. The filter element 52*b*, the further filter element 52'*b* and the fan 48*b* are together arranged in the housing unit 58*b*. The housing unit 58*b* comprises an air guide duct 82*b* accommodating the filter element 52*b* and the further filter element 52'*b*, which is configured for guiding the airflow 50*b* between the filter element 52*b* and the fan 48*b*. The filter element 52*b* and the further filter element 52'*b* are arranged in a stacked fashion. In terms of fluid dynamics, the filter element 52*b* is arranged before the fan 48*b* along the airflow 50*b*. In terms of fluid dynamics, the further filter element 52'*b* is arranged before the filter element 52*b* along the airflow 50*b*. The airflow 50*b* is deflected by at least approximately 90° between the fan 48*b* and the filter element 52*b*. A deflection of the airflow 50*b* is effected in the air guide duct 82*b*. It would however also be conceivable that an air guide duct 82*b* can be done without. A flow-through direction $r_1$ of the airflow 50*b* through the filter element 52*b* is essentially different from a flow-through direction $r_2$ of the airflow 50*b* through the fan 48*b*. A flow-through direction $r_3$ of the airflow 50*b* through the further filter element 52'*b* is essentially different from a flow-through direction $r_2$ of the airflow 50*b* through the fan 48*b*. The flow-through direction $r_3$ of the airflow 50*b* through the further filter element 52'*b* is substantially equivalent to the flow-through direction $r_1$ of the airflow 50*b* through the filter element 52*b*. The flow-through direction $r_2$ of the airflow 50*b* through the fan 48*b* extends parallel to a main extension plane 56*b* of the fan 48*b*. The flow-through direction r of the airflow 50*b* through the filter element 52*b* extends perpendicularly to the main extension plane 54*b* of the filter element 52*b*. The flow-through direction $r_3$ of the airflow 50*b* through the further filter element 52'*b* extends perpendicularly to the main extension plane 54'*b* of the further filter element 52'*b*. The flow-through direction $r_1$ of the filter element 52*b* and the flow-through direction $r_3$ of the further filter element 52'*b* are angled by at least approximately 90° relative to the flow-through direction $r_2$ of the fan 48*b*.

FIG. 8 shows a blower device 14*c* of a respiratory protection system. The blower device 14*c* is configured for a generation of a breathing airflow. The blower device 14*c* is configured for a generation of a breathing airflow 26*c* for a mouth protection device.

The blower device 14*c* comprises a housing unit 58*c*. The housing unit 58*c* is embodied by a synthetic housing. The housing unit 58*c* comprises two interconnected housing shells 70*c*, 72*c*, namely a first housing shell 70*c* and a second housing shell 72*c*. The housing unit 58*c* has a thickness d of less than 70 mm. The second housing shell 72*c* forms a rear wall 110*c* of the housing unit 58*c*. In an operation, the rear wall 110*c* of the housing unit 58*c* in particular rests on a user's back.

Furthermore the blower device 14*c* comprises a fan 48*c* for generating an airflow 50*c*. The blower device 14*c* is configured to generate a positive pressure in the mouth protection device. The fan 48*c* is configured to generate a positive pressure in the mouth protection device. The fan 48*c* is embodied by an electric radial fan.

The blower device 14*c* further comprises a filter element 52*c*. The filter element 52*c* is configured to be flown through by the airflow 50*c*. The filter element 52*c* is implemented by a rectangular-cuboid-shaped filter module. The filter element 52*c* is embodied by a suspended-matter filter. The filter element 52*c* is embodied as a depth filter, in particular as a lamellate filter. A main extension plane of the filter element 52*c* extends at least substantially parallel to a main extension plane of the housing unit 58*c*. The filter element 52*c* is arranged in a lower region of the blower device 14*c*. The housing unit 58*c* accommodates the fan 48*c* and the filter element 52*c*. The fan 48*c* is arranged beside the filter element 52*c*, wherein the airflow 50*c* is deflected between the fan 48*c* and the filter element 52*c*.

The fan 48*c* is arranged beside the filter element 52*c*, wherein the airflow 50*c* is deflected between the fan 48*c* and the filter element 52*c*. The filter element 52*c* and the fan 48*c* are together arranged in the housing unit 58*c*. The housing unit 58*c* comprises an air guide duct 82*c*, which accommodates the filter element 52*c* and is configured for guiding the airflow 50*c* between the filter element 52*c* and the fan 48*c*. In terms of fluid dynamics, the filter element 52*c* is arranged before the fan 48*c* along the airflow 50*c*. The airflow 50*c* between the fan 48*c* and the filter element 52*c* is deflected by at least approximately 90°. A deflection of the airflow 50*c* is effected in the air guide duct 82*c*. It would, however, also be conceivable that an air guide duct 82*c* may be dispensed with. A flow-through direction $r_1$ of the airflow 50*c* through the filter element 52*a* is substantially different from a flow-through direction $r_2$ of the airflow 50*c* through the fan 48*c*. The flow-through direction $r_2$ of the airflow 50*c* through the fan 48*c* extends parallel to the main extension plane of the fan 48*c*. In case of an implementation of the fan 48*c* as an axial fan, it would also be conceivable that the flow-through direction $r_2$ of the airflow 50*c* through the fan 48*c* extends perpendicularly to the main extension plane of the fan 48*c*. A flow-in direction $r_4$ of the airflow 50*c* into the fan 48*c* extends perpendicularly to the main extension plane of the fan 48*c*. A flow-out direction of the airflow 50*c* into the fan 48*c* extends parallel to the main extension plane of the fan 48*c*. The flow-through direction r of the airflow 50*a* through the filter element 52*a* extends perpendicularly to the main extension plane 54*a* of the filter element 52*a*. The flow-through direction $r_1$ of the filter element 52*a* is angled by at least approximately 90° relative to the flow-through direction $r_2$ of the fan 48*a* (FIG. 3). The fan 48*c* has at least one inlet 118*c*, through which the airflow 50*c* is sucked into the fan 48*c*. The inlet 118*c* is formed by an axial inlet. The flow-in direction $r_4$ of the airflow 50*c* into the fan 48*c* is at least substantially opposed to a flow-in direction $r_5$ of the airflow 50*c* into the filter element 52*c*. The fan 48*c* is embodied by a radial fan, such that air is sucked axially into the fan 48*c*. An axis of rotation of the fan 48*c* in particular extends at least substantially perpendicularly to a main extension plane of the filter element 52*c*. The airflow 50*c* flows through the filter element 52*c*, is then deflected towards the fan 48*c* by the air guide duct 82*c* and is then sucked into the fan 48*c* in the region of the fan 48*c* perpendicular to the main extension plane of the fan 48*c*. An airflow 50*c* flowing into the filter element 52*c* therefore flows towards the rear wall 110*c*, while the airflow 50*c* when flowing into the fan 48*c* is directed away from the rear wall 110*c*. The flow-in direction $r_4$ of the air flow 50*c* into the fan 48*c* is angled by at least approximately 170° with respect to the flow-in direction $r_5$ of the air flow 50*c* into the filter element 52*c*.

The rear wall 110*c* of the housing unit 58*c* has a flow guiding body 112*c* which is configured to guide the air flow 50*c* when flowing into the fan 48*c*. The flow guiding body 112*c* protrudes into a flow channel of the air flow 50*c* between the filter element 52*c* and the fan 48*c*. The flow guiding body 112*c* is configured to deflect an airflow 50*c*, with an airflow 50*c* in particular being calmed when deflected. The flow guiding body 112*c* has a flow guiding wall 114*c*, which is configured to be flowed against by an air flow 50*c*. The airflow 50*c* is deflected from the flow guiding wall 114*c* by at least 90° towards the inlet 116*c* of the fan 48*c*. The flow guiding wall 114*c* has, in a cross-section perpendicular to a flow-in direction $r_4$ of the fan 48*c*, a spiral-sector-shaped course. A radius of the course of the flow guiding wall 114*c* decreases towards the inlet 118*c* of the fan 48*c*. A flow sensor is arranged on an inlet side of the flow guiding wall 114*c*. The flow sensor is arranged on a sensor mount 116*c* of the rear wall 110*c*. The flow guiding wall 114*c* is a wall of the flow guiding body 112*c* facing the flow channel of the air flow 50*c*. The flow guiding body 112*c* is directly arranged next to the fan 48*c*. The flow guiding body 112*c* is preferably directly arranged next to the fan 48*c* in a region of the inlet 118*c* of the fan 48*c*.

REFERENCE NUMERALS

10 respiratory protection system
12 mouth protection device

14 blower device
16 mask base body
18 user
20 breathing region
22 breathing air supply line
22' breathing air supply line
24 breathing air duct
26 breathing airflow
28 fixation strap
30 head
32 connection unit
34 adjustment unit
36 side edge
38 separation layer
40 outlet region
42 discharge valve
44 partial region
46 breathing air line
48 fan
50 airflow
52 filter element
52' filter element
54 main extension plane
54' main extension plane
56 main extension plane
58 housing unit
60 vest
62 operating unit
64 operating element
66 control and/or regulation unit
68 sensor unit
70 housing shell
72 housing shell
74 cover
76 cover
78 air inlet opening
80 air outlet opening
82 air guide duct
84 energy storage
86 control and/or regulation unit
88 cable
90 sealing element
92 coupling element
94 coupling element
96 actuation element
98 head-fixation strap
100 fixation unit
100' fixation unit
102 cord
104 cord clamp
106 cutout
108 T-connector
110 rear wall
112 flow guiding body
114 flow guiding wall
116 sensor mount
118 inlet
d thickness
$r_1$ flow-through direction
$r_2$ flow-through direction
$r_3$ flow-through direction
$r_4$ flow-in direction
$r_5$ flow-in direction

The invention claimed is:

1. A blower device for a respiratory protection system, with a fan for a generation of an airflow and with at least one filter element that is configured to be flowed through by the airflow, wherein the fan is arranged at least partly beside the at least one filter element, wherein the airflow is deflected between the fan and the at least one filter element, wherein the fan has at least one inlet, through which the airflow is sucked into the fan, wherein a flow-in direction ($r_4$) of the airflow into the fan is at least substantially opposed to a flow-in direction ($r_5$) of the airflow into the at least one filter element, wherein the flow-in direction ($r_4$) of the airflow into the fan is angled relative to the flow-in direction ($r_5$) of the airflow into the at least one filter element by at least 140°, wherein a housing unit has a rear wall, having a flow guiding body which is configured to guide the airflow when flowing into the fan, and wherein the flow guiding body has a flow guiding wall which has, in a cross-section perpendicular to the flow-in direction ($r_4$) of the fan, a spiral-sector-shaped course.

2. The blower device according to claim 1, wherein a flow-through direction ($r_1$) of the airflow through the at least one filter element is substantially different from a flow-through direction ($r_2$) of the airflow through the fan.

3. The blower device according to claim 1, wherein the at least one filter element has a main extension plane and the fan has a main extension plane, wherein a distance from the main extension plane of the at least one filter element to the main extension plane of the fan is smaller than a maximum thickness of the at least one filter element.

4. The blower device according to claim 1, wherein the at least one filter element has a main extension plane and the fan has a main extension plane, wherein at least a large portion of normal vectors of the main extension plane of the at least one filter element, which intersect with the at least one filter element, is free of an intersection point with the fan.

5. The blower device according to claim 1, the at least one filter element comprising a first filter element and a further filter element, the further filter element is arranged beside the fan and beside the first filter element and whose flow-through direction ($r_3$) of the airflow differs from a flow-through direction ($r_2$) of the airflow through the fan, wherein the further filter element is disposed to be flown through by the airflow before the first filter element is flown through by the airflow.

6. The blower device according to claim 1, wherein the at least one filter element has a main extension plane and the fan has a main extension plane, wherein the main extension plane of the at least one filter element is angled relative to the main extension plane of the fan.

7. The blower device according to claim 1, wherein the housing unit accommodates the fan and the at least one filter element and has a thickness (d) of less than 70 mm.

8. The blower device according to claim 1, wherein the fan is configured for a generation of a volumetric flow rate of the airflow of at least 50 l/min and maximally 250 l/min.

9. A respiratory protection system with a blower device according to claim 1 and with a mouth protection device.

10. The respiratory protection system according to claim 9, wherein the blower device is configured for a generation of a positive pressure in the mouth protection device.

11. The respiratory protection system according to claim 9, comprising a vest that is configured to be worn by a user, the blower device being configured to be arranged on the back of the user.

12. The respiratory protection system according to claim 9, comprising a remote control comprising at least one physical input and at least one controller and/or processor, which is configured for a control and/or regulation of the blower device.

13. The respiratory protection system according to claim 12, wherein the remote control comprises at least one sensor for capturing at least one environment parameter, wherein the controller and/or processor is configured, in at least one operation state, for a control and/or regulation of the blower device on the basis of the at least one environment parameter.

* * * * *